Feb. 24, 1959      O. W. SHIRLEY      2,874,577
GYROSCOPE
Filed July 15, 1958      3 Sheets-Sheet 1
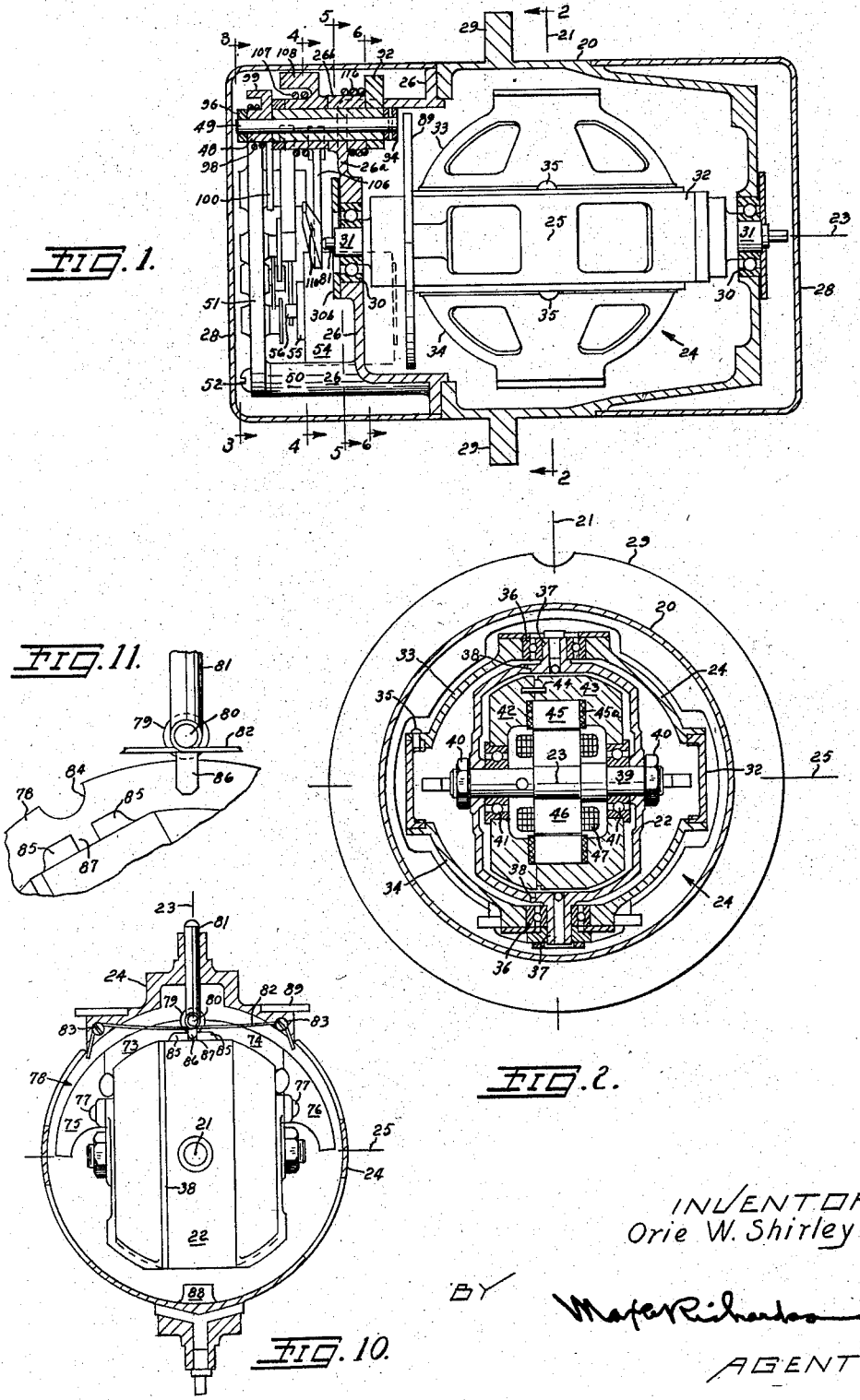
INVENTOR
Orie W. Shirley
BY
AGENT

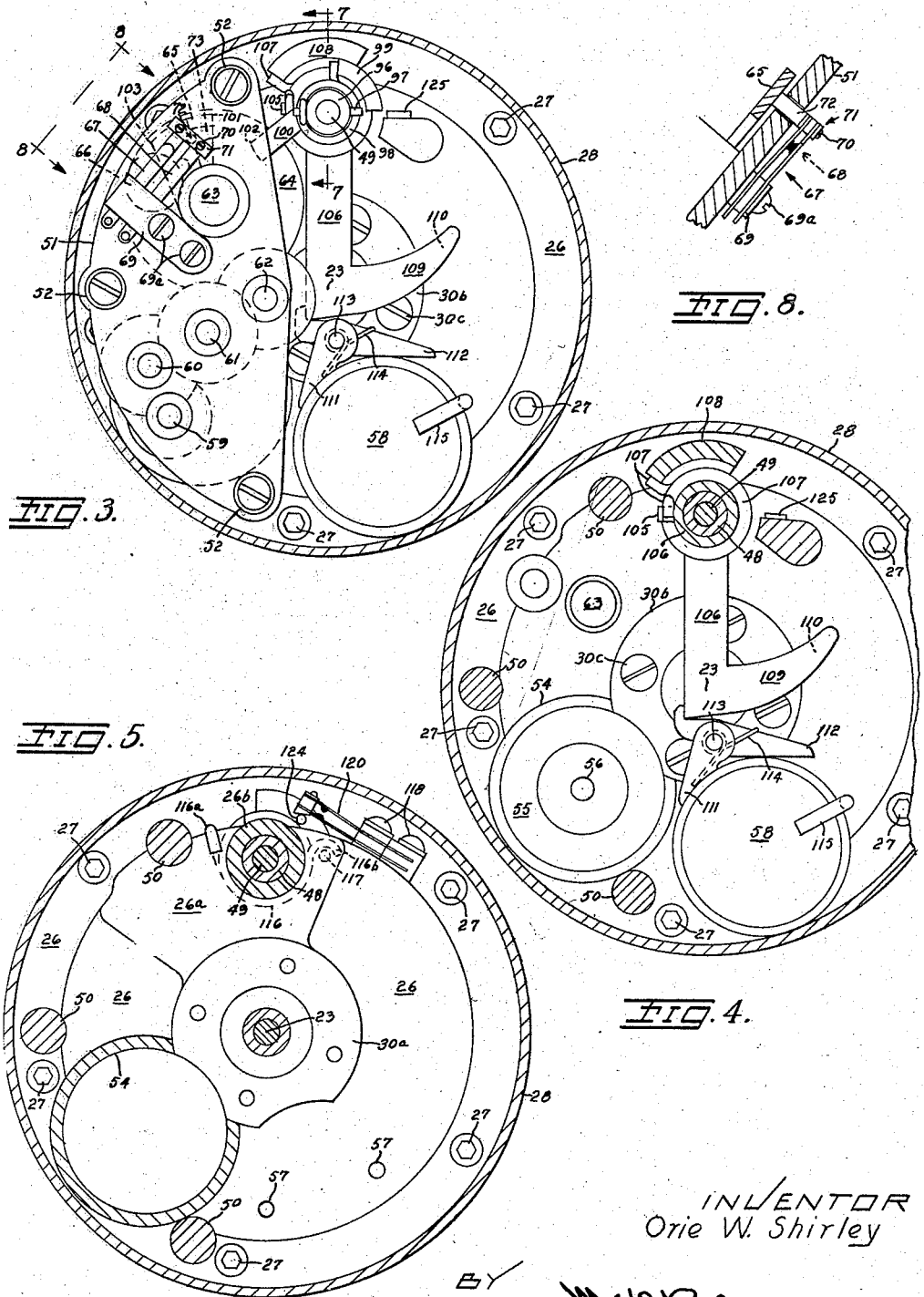

Feb. 24, 1959     O. W. SHIRLEY     2,874,577
GYROSCOPE

Filed July 15, 1958     3 Sheets-Sheet 3

INVENTOR
Orie W. Shirley

BY

AGENT

United States Patent Office 2,874,577
Patented Feb. 24, 1959

2,874,577
GYROSCOPE

Orie W. Shirley, Portland, Oreg., assignor to Iron Fireman Manufacturing Company, a corporation of Oregon Application July 15, 1958, Serial No. 748,619

4 Claims. (Cl. 74—5.1)

This invention relates generally to gyroscopes and more particularly to gyroscopes having means for the precise caging thereof, caging being understood to mean bringing the three major axes of the gyroscope into positions of mutual perpendicularity. Specifically this invention relates to a free gyroscope having no means for continuous erection and includes a novel and useful means for caging and uncaging the gyroscope when required.

The form in which the present invention is here disclosed will include a 3 phase spin motor stator fixed to a spin axis shaft secured transversely through a hollow case or inner gimbal ring spaced from and surrounding the stator. A relatively heavy spin wheel including the rotor iron and rotor winding of the motor is rotatably mounted on the shaft outside the motor stator and inside the case or inner gimbal.

The novel and useful parts and arrangement of parts of the wheel, spin motor and case combination are features of this invention.

The case or inner gimbal ring is freely rotatably carried within an outer gimbal ring on an inner ring axis perpendicular to the axis of the spin motor shaft.

The outer gimbal ring is rotatably carried within a frame for free rotation about an outer ring axis perpendicular to the inner axis.

The gyroscope is in normal, neutral, or caged, arrangement of parts when the inner gimbal ring is rotated on the inner ring axis to a position of perpendicularity of the spin and outer ring axes and when the outer gimbal ring is rotated on the outer ring axis to a pre-set position with respect to the frame.

The gyroscope is intended to be secured by its frame to any desired object, movable in space, in such a manner that in its caged condition the gyroscope will have its inner and outer perpendicular axes aligned respectively with reference axes about which the angular positions of the body may be indicated when the gyroscope wheel is freely spinning and the inner and outer rings are released from their caged restrictions. The means for indicating the angular positions of the inner and outer rings relative to their caged positions about their respective axes are well known in the art and no part of this invention so they are not here described.

It is the principal object of this invention to provide an improved free gyroscope with means for quickly and precisely caging and uncaging the inner and outer rings thereof whereby for a reasonable time after uncaging the angular positions of the inner and outer gimbal rings about their respective axes relative to their caged positions about these axes will indicate the instantaneous positions of the frame about these axes.

It is another object to provide such a gyroscope with means for caging the gyroscope by first applying both a caging torque and a holding brake resiliently for a specified time to the outer gimbal ring to prevent movement thereof and within that time positively to torque the inner gimbal ring to its caged position while building up an increasing caging torque on the outer gimbal ring, then while holding the inner gimbal ring in caged position to release the holding brake to allow the caging torque built up on the outer gimbal ring to cage the outer gimbal ring.

It is a third object to provide a gyroscope with such a caging mechanism that will operate automatically to cage the gyroscope in a minimum time after the caging cycle is initiated and then signal that the gyroscope is in caged condition and ready to be uncaged as desired.

It is a fourth object to provide a gyroscope with such a caging mechanism having means for holding the gimbal rings in caged positions by latches so applied that they may be operated to unlatch both gimbal rings at the same time.

It is a fifth object to provide a gyroscope with uncaging means adapted simultaneously to free the inner and outer gimbal rings of the gyroscope from their caged positions.

How these and other objects are attained is disclosed in the following specifications referring to the attached drawings in which Fig. 1 is a fragmental plan view in partial section of one form of the gyroscope of this invention viewed in the direction of the spin axis of the gyroscope when caged.

Fig. 2 is a fragmental sectional view along line 2—2 of Fig. 1.

Fig. 3 is a fragmental sectional view along line 3—3 of Fig. 1.

Fig. 4 is a fragmental sectional view along line 4—4 of Fig. 1.

Fig. 5 is a fragmental sectional view with parts omitted, along line 5—5 of Fig. 1.

Fig. 8 is a fragmental side elevation in partial section viewed from line 8—8 in Fig. 3.

Fig. 10 is a fragmental view in partial section of the gyroscope of Fig. 1.

Fig. 11 is a fragmental enlargement of part of Fig. 10 with the parts displaced.

Like numerals of reference refer to like parts in the several figures of the drawing.

Figure 6:
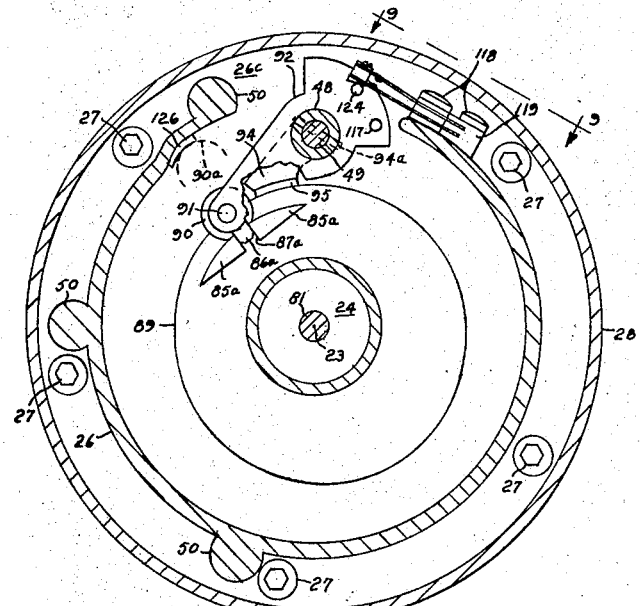
Fig. 6 is a fragmental sectional view along line 6—6 of Fig. 1.

Referring now to the drawings, Fig. 1 shows the present form of the gyroscope of this invention with the supporting frame 20 in section in the common plane of the axis 21 of the inner gimbal ring 22 and the axis 23 of the outer gimbal ring 24 when the gyroscope is caged and its spin axis 25 is perpendicular to the plane of the axes 21 and 23. End bell 26 is seen to complete frame 20 and is secured thereto by screws 27 as clearly shown in Figs. 3 to 6. End covers 28 protect and hermetically seal the active parts of the gyroscope but otherwise are not functional. Annular flange 29 girdling frame 20 about its axis 23 is for the purpose of mounting the gyroscope where it is to be used, tested, inspected or adjusted.

Frame 20 and its end bell 26 are seen in Fig. 1 to be formed along the axis 23 with bearing seats adapted to receive as shown the outer races of ball bearings 30 the inner races of which are adapted as shown to receive hubs 31 formed on the generally cylindrical section 32 of outer gimbal ring 24. End bells 33, 34 secured to opposite faces of cylindrical section 32 by screws 35 are formed along axis 21 to receive the outer races of bearings 36 the inner races of which are adapted to receive, as shown, hubs 37 of inner gimbal ring 22 which for construction purposes is divided into two parts along the annular rabbet line 38 shown in Figs. 2 and 10. The two parts of inner ring 22 are seen in Fig. 2 to be formed along the spin axis 25 with axial bores adapted to receive neatly therethrough and stationary with respect thereto a dead shaft 39 the reduced and threaded ends of which receive nuts 40 the tightening of which on shaft 39 not only secures together the two parts of inner gimbal ring 22 but also by pressing axially on the inner races of rotor bearings 41 carried, as shown, on shaft 39 cause the outer races of bearings 41 to clamp together axially the rotor weight parts 42, 43 shown dowelled together at 44 in Fig. 2. Also clamped into weight parts 42, 43 as shown are spin motor parts rotor iron 45 and rotor winding 45a. Spin motor stator iron 46 carrying stator winding 47 is pressed onto shaft 39 as shown. Since the weights 42, 43 and shaft 39 are the same stainless steel material no problem of temperature stress in the bearings 41 are found with this construction. Adapted for the present use stator winding 47 is proportioned for 115 volt, three phase, 400 cycle service.

From the above it is seen that the stator iron 46, excited by winding 47, cooperates with rotor iron 45 and induction winding 45a to drive the spin motor and rotor weights 42, 43 at about 23,000 R. P. M. on bearings 41 about spin axis 25 in inner gimbal ring 22 which in turn is freely rotatably carried on bearings 36 about axis 21 in outer gimbal ring 24 freely rotatably carried on bearings 30 about axis 23 in frame 20 with its end bell 26.

Having thus shown a gyroscope structure, it should be pointed out that the use to which the gyroscope is put and the special structures which adapt the gyroscope to its desired use are no part of this invention and will not be here described except to note that in the use of the gyroscope as a precision instrument it is required that the gyroscope be provided with accessory structure capable of caging the gyroscope within about six seconds of elapsed time and with structure for releasing both gimbal rings of the caged gyroscope precisely simultaneously and completing the uncaging, or releasing of the gyroscope to complete freedom of its gimbal rings, within one tenth second of the start of the uncaging operation. Caging and uncaging schemes for gyroscopes are old and precise uncaging has been accomplished previously but, as far as known, no previous mechanisms of such small size has been capable of caging and uncaging its associated gyroscope with the speed and precision of the present invention.

To describe the novel caging and uncaging structure of the present device attention is called to end bell 26 of frame 20 which is seen in Figs. 1 and 5 to have a relatively flat end wall having a central bore to receive bearing 30 and a flat surface 30a around the central bore to which bearing retainer 30b is to be secured by screws 30c. In Figs. 1 and 5 it is also seen that the top of the end wall is raised outwardly as at 26a and above 26a the cylindrical wall is cut away to open the top of the end bell as shown at 26c in Fig. 6. Figs. 1 and 7 show how bearing boss 26b is formed on the upper end of part 26a of the end wall of end bell 26 rotatably to support therein hollow shaft 48 which in turn rotatably supports shaft 49.

Formed outwardly axially parallel from the end of end bell 26 are three bosses 50 each end faced and centrally tapped to support a gear train base 51 held thereon by screws 52. Also formed axially outwardly on the end of end bell 26 as shown in Fig. 5 is a cylindrical wall 54 with an open end adapted to receive and secure therein a caging motor 55 complete with a driving pinion 56 as seen in Figs. 1 and 4. The motor here used is a size 10 servomotor made by Clifton Precision Products Co., Inc., Clifton Heights, Pa., for use on a 26 volt, 400 cycle per second, one phase electric service.

Two tappered holes 57 are shown in Fig. 5 in the end wall of end bell 26 for the purpose of securing thereon by screws, not shown, the rotary solenoid 58 as seen in Figs. 3 and 4. The rotary solenoid here used is made by G. H. Leland Co., of 123 Webster St., Dayton, Ohio, and listed by the maker as Rotary Solenoid Ledex BD-1.

As partially shown in Figs. 1 and 3, gear train base 51 includes a series of stub shafts cantilevered therefrom. On four of the shafts 59, 60, 61 and 62, a series of intermediate cluster gear and pinion sets of a gear train are rotatably secured. On the fifth shaft 63 the slow speed gear 64 of the gear train is rotatably carried.

Motor 55 is designed to run at about 6500 R. P. M. and its pinion 56 drives the high speed end gear of the gear train. The reduction through the gear train is about 650 to one so that low speed gear 64 will be driven by motor 55 at about 10 R. P. M. or 60 degrees per second.

Omitted from Fig. 1 to avoid confusion but shown dotted in outline in Fig. 3 are a sector arm 65 and a roller 66. Arm 65 is secured to the hub of gear 64 between base 51 and gear 64. Roller 66 is rotatably carried on a sub shaft, not shown, secured to gear 64 and extending therefrom on the side opposite arm 65.

As shown in Figs. 3 and 8 a pair of electric switches 67 and 68 are seen to include an insulating laminated base structure 69 between which the resilient bronze stationary and moving contact blades of the switches are spaced and insulatedly secured to gear train base 51 by screws 69a. As best seen in Fig. 8 the longer moving contact blades of switches 67 and 68 are clamped by screws 70 between insulating switch operating structure 71 formed with an operating extension 72 extending freely through a clearance hole as shown formed through gear train base 51 to intercept arm 65 as arm 65 rotates clockwise with gear 64 about shaft 63.

It should be noted that while arm 65 has a flat face on its side next to gear 64 its opposite side next to base 51 is beveled at 73 on its leading edge. It will later be shown that the control of caging motor 55 is such that at rest gear 64 and arm 65 always take the position shown in Fig. 3, motor 55 only being started to cage the gyroscope and when started always runs for one full turn of gear 64 and stops at the position from which it starts. The moving contact blades of switches 67, 68 bias switch 67 towards its open position, switch 68 towards its closed position and operating extension 72 towards arm 65. With operating extension 72 unrestrained by arm 65 it will extend through gear base 51 far enough to close switch 68, open switch 67, and for the end of extension 72 to intercept arm 65 only on its sloping surface 73 on which it will ride until switch 68 is opened to stop the motor until switch 67 is closed and until extension 72 is resting on the flat side of arm 65 as shown.

Referring now to Figs. 10 and 11 it is seen that the rotor case or inner gimbal ring 22 is carried in outer gimbal ring 24 rotatably about inner ring axis 21 and in a plane perpendicular to axis 21 carries an inner ring caging cam 78 made up of parts 73, 74 cast as parts respectively of the two parts of case 22 and parts 75 and 76 formed separately and secured, as shown, to case 22 by screws 77. Note that the outer radius of cam 78 reduces regularly from its ends of its centerline shown in the plane of axes 21 and 23 in Fig. 10. In Fig. 11 case 22 is shown out of its caged position to show the semicircular recess 84 in the edge face of cam 78 which is shown in Fig. 10 to be occupied by caging cam roller 79 rotatably carried on shaft 80 secured to follower stem 81 carried on outer gimbal 24 as shown for substantially frictionless movement along axis 23. Pressing stem 81 downwardly to press roller 79 against cam 78 causes cam 78 to rotate about axis 21 towards its shortest radius position of contact with roller 79. Wire spring 82 looped at its center about shaft 80 and near its ends over screws 83, as shown, biases stem 81 and roller 79 away from cam 78. Formed on case 22 at one side of cam 78 are a pair of lugs 85 having spaced apart parallel faces adapted between them in space 87 to receive tongue 86 rigidly extending from stem 81 alongside cam 78. Tongue 86 has its corners chamfered as shown so that as roller 79 drops into recess 84, tongue 86 at its end clears the corner of the appropriate lug 85. Then with its chamfered corner riding a corner of lug 85, tongue 86 lines up cam 78 so that tongue 86 and roller 79 drop radially into spaces 87 and 84 respectively, and the inner ring is caged. Although cam 78 is only a 180 degree cam it can not get from under roller 79 because of two way stop 88 extending inwardly from the wall of outer gimbal ring 24 into the path of rotation of the two ends of cam 78.

Figure 7:
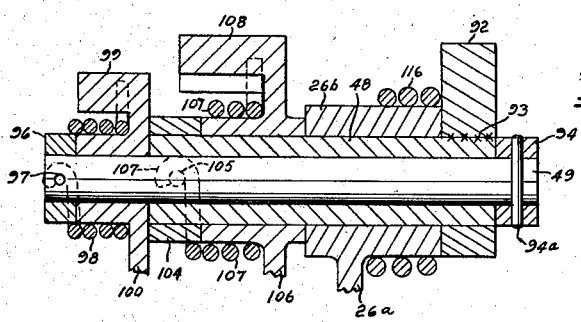
Fig. 7 is a fragmental sectional view along line 7—7 of Fig. 3.

Referring to Figs. 1, 6 and 10 it is noted that outer gimbal ring 24 has secured thereto for rotation about the outer gimbal ring axis 23 a 360 degree edge cam 89 adapted to cooperate with cam follower roller 90 to cage the outer gimbal ring 24, cam 89 is eccentric symmetrically about a diameter including its caging recess into which roller 90 is seen to be located in Fig. 6. Along that diameter the radius of cam 89 is shortest at the caging recess and longest diametrically opposite the caging recess. Roller 90 is freely rotatably carried (Fig. 6) on stub shaft 91 extending parallel to axis 23 from caging arm 92 secured to shaft 48 as seen at 93 in Fig. 7. Lugs 85a with their intervening space 87a on cam 89 and tongue 86a on arm 92 cooperate with roller 90 in caging cam 89 in the same way as above described that lugs 85, and space 87 on cam 78 and tongue 86 on stem 81 cooperate with roller 79 in caging cam 78.

Figs. 5 and 7 show spring 116 coiled loosely around bearing boss 26b with one end 116a looped over the vertical edge of wall 26a of frame end bell 26 and the other end 116b looped over pin 117 held transversely through the integral balancing weight end of caging arm 92. Spring 116 biases caging arm 92 with hollow shaft 48 and collar 104 towards clockwise rotation in bearing hub 26b as seen in Fig. 5.

Figure 9:
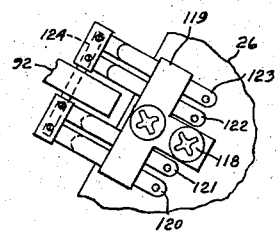
Fig. 9 is a fragmental side elevation in partial section viewed from line 9—9 in Fig. 6.

Figs. 5, 6 and 9 show secured to the outer cylindrical wall of end bell 26 by screws 118, the laminated insulated base 119 of four electric switches 120, 121, 122 and 123 generally constructed similarly to switches 67, 68 previously described. It is to be noted that all four switches are operated simultaneously by operating pin 124 held transversely through arm 92. As shown in Fig. 6 it is seen that when roller 90 drops into its caging recess in cam 89, arm 92 rotates counterclockwise to cause pin 124 to rise under switches 120 to 123 to close switches 122, 123 and open switches 120, 121. Then when arm 92 rotates clockwise to release cam 89, pin 124 releases switches 120 to 123 which due to the resilience of their moving contact blades will return to their uncaged positions with switches 120, 121, closed and switches 122, 123 open.

As previously described shaft 49 is rotatably carried in hollow shaft 48 which in turn is rotatably carried in bearing boss 26b formed on the end wall 26a of frame end bell 26. In Figs. 1, 6 and 7 it is seen that outer gimbal ring brake arm 94 is secured to shaft 49 by pin 94a and carries, offset at its free end, a brake face with a brake lining 95 in position to bear on cam 89 when shaft 49 is urged in a counter clockwise direction as viewed in Fig. 6 or from the left in Figs. 1 and 7. Collar 96 is secured to shaft 49 by pin 97 which also secures one end of coil spring 98 to shaft 49. The other end of spring 98 is seen in Fig. 3 to abut the integral balancing weight 99 formed on brake lever 100 rotatably carried on shaft 49 and confined thereon by collar 96. As seen in Fig. 3 when the caging motor 55 is started arm 65 rotating clockwise with slow speed gear 64 will strike lever 100 which will rotate counter clockwise on shaft 49 and take with it one end of spring 98 the other end of which will yieldingly, through shaft 49 and brake arm 94, press brake lining 95 on cam 89 with increasing pressure until the outer limit corner 101 of arm 65 meets the corner 102 of lever 100 after which corner 102 of lever 100 will ride along the perimeter of arm 65 until the trailing corner 103 of arm 65 slips off of corner 102 of lever 100 releasing lever 100 to release spring 98 and brake arm 94 to release all brake pressure from cam 89.

Spaced between bearing boss 26b and lever 99 by collar 104 secured to hollow shaft 48 by screw pin 105 is inner gimbal ring caging lever 106 rotatably carried on shaft 48 and yieldingly connected therewith by spring 107 one end of which is engaged with pin 105 and the other end of which abuts the integral balancing weight 108 of lever 106, as seen in Fig. 4. As seen in Fig. 1, caging lever 106 has a radial body having parallel flat sides and an L end 109 formed with a cam face 110 adapted to engage stem 81 to force roller 79 against the edge face of cam 78 to cage the inner gimbal ring as previously shown.

Figs. 3 and 4 show rotary solenoid 58 secured to end bell 26 by screws, not shown, threaded into holes 57 shown in Fig. 5. On the upper side of solenoid 58 is secured a hinge bracket 111 to which latch lever 112 is pivoted by hinge pin 113. Spring 114 biases lever 112 toward clockwise rotation about pin 113 the motion being limited by lever 112 striking the case of solenoid 58 as shown in Fig. 4. Secured to the rotatable end of solenoid 58 is an L-shaped trip arm 115 one leg of which extends back over the case of solenoid 58. In Figs. 3 and 4 trip arm 115 is shown in its at rest position but when the solenoid is energized it rotates about 60 degrees counterclockwise at which position an automatic switch included therein shuts off its power to return it to the starting position shown. During the substantially instantaneous movement of arm 115 when solenoid 58 is energized, it rides under latch lever 112 to overcome the bias of spring 114 on lever 112 to unlatch caging lever 106. This uncaging operation is never initiated by exciting solenoid 58 until the gyroscope is caged with the parts thereof as shown in the drawings.

Remembering that motor 55 is only operated to cage the gyroscope and that once started the motor runs for one complete revolution of slow speed gear 64, it is understood that while Fig. 3 shows the positions of gear 64 and lever 106 when the gyroscope is caged, when the gyroscope is uncaged gear 64 will again be in the position shown in Fig. 3 but under the bias of springs 116 and 107 lever 106 will have moved clockwise almost into contact with roller 66 which as previously noted is carried on gear 64 in alignment with lever 106. Therefore when motor 55 is started gear 64 rotates one revolution clockwise taking with it roller 66 which soon contacts lever 106 and rotates lever 106 counterclockwise until lever 106 is latched by lever 112 as shown and roller 66 continues with gear 64 to stop in its original position as shown.

From Figs. 1 and 10 it is plain that spring 82 continuously biases inner gimbal ring cam follower stem 81 against the face cam side 110 of lever 106 so that in the gyroscope caging operation as roller 66 rotates lever 106, face cam 110 of lever 106 forces stem 81 to press cam roller 79 against the cam surface of edge cam 78 and thus forces the inner gimbal ring or case 22 into caged position after which lever 106 is latched by lever 112 and roller 66 moves on as described.

At the same time that lever 106 is being rotated to cage the inner gimbal ring 22, lever 106 through spring 107 is resiliently forcing hollow shaft 48 to rotate caging arm 92 against the bias of spring 116 to press cam follower roller 90 against outer gimbal ring caging cam 89 but at the same time that roller 66 on gear 64 is rotating lever 106, arm 65 on gear 64 is rotating lever 100 which through spring 98 is forcing shaft 49 and brake arm 94 to put increasing braking pressure of lining 95 onto cam 89 to prevent cam 89 from turning until brake arm 94 is released by arm 65 slipping off lever 100 after lever 106 has caused the inner gimbal ring 22 to be caged. When arm 65 slips off lever 100, lever 100 backs off and relieves brake arm 94 of the pressure built up by spring 98. Thus brake lining 95 releases cam 89 and the energy built up in spring 107 is released through roller 90 to cage outer gimbal ring cam 89.

Figure 12:
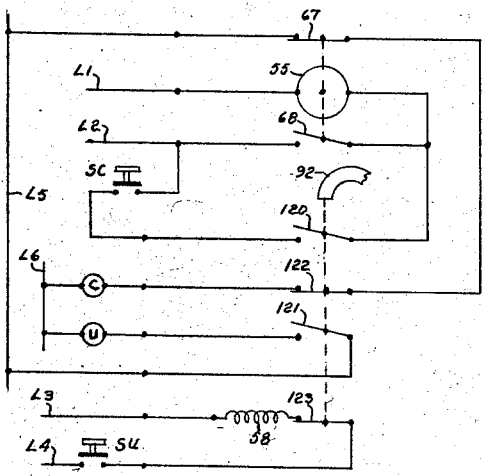
Fig. 12 is a schematic wiring diagram of the caging and uncaging means of this invention.

While the wiring details of my caging method have been omitted from Figs. 1 to 11, the wiring scheme is simply shown in Fig. 12 in which lines L1, L2 are power supply lines for the 26 volt, 400 cycle, one phase power required by caging motor 55; lines L3, L4 are power supply lines for the 30 volt, D. C. power required by solenoid 58; and lines L5, L6 are any signal power supply lines as needed for the caged or uncaged condition signals marked C and U respectively. SC indicates a manually closed spring released starting switch for motor 55, as does SU for solenoid 58. Switches 67, 68, 120, 121, 122, 123, are as previously described and are shown in their positions when the gyroscope is caged. Switches 67, 68 are indicated to be operated by motor 55 it being understood that this is done through the gear train and gear 64. Switches 120 to 123 are indicated to be operated by caging arm 92.

As previously described switches 67 and 68 will be in the position shown whenever the motor is stopped whether the gyroscope is caged or uncaged, while switches 120 to 123 are shown only in their positions when the gyroscope is caged. When the gyroscope is uncaged switches 120 and 121 will be closed and switches 122 and 123 will be open.

Assuming then that the gyroscope is uncaged and it is desired to cage it. Switch 121 will be closed and the signal U will show that the gyroscope is uncaged and is ready to cage. As above noted when motor 55 is energized it will rotate gear 64 at about 60 degrees per second or 1 revolution in about 6 seconds.

To cage the gyroscope, depress manual caging switch SC. Motor 55 will be energized from L2 through starting switch SC, safety switch 120 (closed when the gyro is uncaged), to motor 55 and on to L1.

Motor starts to run and turn gear 64 clockwise at 60 degrees per second taking with it arm 65 and roller 66 as seen in Fig. 1.

In one-quarter second arm 65 runs out from under switch operator 72 closing motor holding switch 68 and opening cage indicating switch 67, cage indicating switch 122 being already open since the gyro is uncaged. About two-thirds second after motor starts, arm 65 strikes arm 100 to rotate shaft 49 resiliently through spring 98 and resiliently apply brake 94 to cam 89 through brake lining 95. In one and one-half seconds from start of motor, corner 101 of arm 65 will slide off corner 102 of arm 100 and brake 94 will have been applied to cam 89 with full pressure. In two and one-quarter seconds after start of motor, corner 103 of arm 65 will slide off corner 102 of arm 100 to release arm 100 to return to its original position under bias of spring 98. All pressure of brake 94 on cam 89 will be released.

In the meantime roller 66 carried on gear 64 will have contacted arm 106 soon after the motor started and have continued to move arm 106 counterclockwise doing two things, i. e., (1) moving cam 109 at the end of arm 106 over the end of stem 81 to cause caging cam 78 of inner ring 22 to move under cam follower roller 79 toward its caged position shown in Fig. 10; and (2) to cause arm 106 through spring 107 and hollow shaft 48 resiliently to press cam follower roller 90 carried on arm 92 against outer ring cam 89 thus storing up caging energy in spring 107 for outer ring cam 89 and uncaging energy in spring 116.

In about two and one-eighth seconds after the motor starts roller 66 will have moved arm 106 to a position where the whole length of arcuate cam surface 110 on end 109 of the lever 106 will have traversed the end of stem 81 and the inner gimbal ring 22 will be caged. In another one sixteenth second lever 106 will have moved to its position of being latched by lever 112 from where roller 66 can leave lever 106 and return with gear 64 to its original position.

But note that in two and one quarter seconds after the motor was started or slightly after lever 106 was latched by lever 112, arm 65 on gear 64 released arm 100 to release outer ring cam from brake 94. Immediately the energy stored in spring 107 is applied by arm 92 and roller 90 to cam 89 to cause cam 89 to rotate under roller 90 to its caged position where roller 90 falls into its caging groove and more of the caging energy of spring 107 is transferred to uncaging spring 116.

After brake 94 is released from cam 89 it will take a maximum of two seconds for the energy of spring 107 applied to cam 89 through roller 90 to complete the caging of outer gimbal ring 24.

Thus in two and one eighth seconds after the motor starts the inner gimbal ring will be caged and in a total of four and one eighth seconds both gimbal rings will be caged and switches 120 to 123 will be returned to their positions shown in Fig. 12, but with switch 68 still closed and switch 67 still open and both of the signals c and u indicating that the gyroscope is neither caged nor uncaged. However in another one and three quarters seconds, or a total of 6 seconds, gear 64 has completed its revolution and the sloping face 73 of arm 65 has run under switch operator 72 and closed switch 67 to energize the caged signal C and to open switch 68 to stop the motor. With the gyroscoped caged all of the switches are in their positions shown in Fig. 12.

With the gyroscope thus caged and ready for its specific use as a free gyro, to free or uncage the gyro it is only necessary to momentarily close manual uncaging switch SU and instantaneously rotary solenoid 58 will rotate one sixth of a turn counterclockwise where it will have raised the tail of latch 112 to release lever 106 and then return to its starting position. It should be noted that levers 106 and 92 and springs 107 and 116 are in the same system and that when the gyro is caged lever 106 is restrained from clockwise movement by latch 112 while spring 116 abuts frame end bell wall 26a to bias lever 92 shaft 48 and lever 106 through spring 107 toward their uncaged positions. Thus when lever 112 unlatches lever 106, spring 107 will start lever 106 clockwise to ease up on spring 116 which then starts lever 92 clockwise with lever 106 moving with the additional impetus of spring 107 to reach its stopped position of abutment of its end 108 on resilient pad 125 (see Fig. 3) at the same time that caging roller 90 reaches its position 90a of abutment against resilient pad 126 on the inside of the cylindrical wall of frame end bell 26 (see Fig. 6).

As lever 106 rotates clockwise spring 82 (see Fig. 10) causes cam follower roller 79 and stem 81 to follow with stem 81 always in abutment with the cam face 110 of part 109 of lever 106.

Remembering that neither caging cam 89 nor 78 can be released until its respective tongue 86a or 86 is free of its respective space 87a or 87 and with both tongues set in motion with substantially the same speed at substantially the same time, it is seen that the simultaneous uncaging of both gimbal rings 22 and 24 is here precisely accomplished. The total time of uncaging after pushing button SU is about one tenth second.

Having thus cited some of the objects of my invention, illustrated and described a preferred form in which my invention may be practiced and explained its operation, I claim:

1. In combination, a gyroscope, including: a frame; an outer gimbal ring freely rotatably carried on said frame for rotation in either direction about an outer ring axis fixed with respect to said frame; an inner gimbal ring comprising a first hollow body freely rotatably carried on said outer gimbal ring for rotation in either direction about an inner ring axis perpendicular to said outer ring axis, a shaft non-rotatably carried through said first hollow body on a spin axis perpendicular to said inner ring axis, one end of said shaft being slidably carried through said first hollow body and threaded outside said body, a nut threadedly carried on said shaft to abut said hollow body on an outside surface thereof and a spin motor stator secured to said shaft between the ends thereof; a rotor comprising a second hollow body freely rotatably carried within said first hollow body on said shaft by a pair of combination radial and thrust bearings spaced respectively on either side of said stator between said stator and the walls of said first hollow body and a spin motor rotor secured within said second hollow body in operative relation with said spin motor stator; said first and second hollow bodies being split to be separable in the direction of said spin axis whereby said motor parts may be assembled in said second hollow body and said second hollow body may be assembled in said first hollow body and all said parts included in said hollow bodies may be relatively positioned along said spin axis as required by turning said nut on said shaft; said shaft and said hollow bodies having identical temperature coefficients of expansion.

2. In combination, a free gyroscope including a frame, an outer gimbal ring freely rotatably carried on said frame for rotation in either direction about an outer ring axis fixed with respect to said frame, an inner gimbal ring freely rotatably carried on said outer gimbal ring for rotation in either direction about an inner ring axis perpendicular to said outer ring axis and a rotor freely rotatably carried on said inner ring for rotation about a spin axis perpendicular to said inner ring axis, each one of said axes intercepting each other of said axes at a common point and said gyroscope being said to be in caged position when the spin axis and the outer ring axis are mutually perpendicular and said outer gimbal ring is at a preset angle to said frame about said outer ring axis, together with means for caging said gyroscope in a minimum length of time, means for latching both said gimbal rings in their said caged positions and means for simultaneously unlatching both said gimbal rings from their said caged positions, said means for caging said gyroscope including a caging motor means, means controlling said caging motor means to complete a caging cycle and return to its starting position, a first caging cam carried on said inner gimbal ring to rotate therewith about said inner ring axis, a first cam follower for said first cam, a second caging cam carried on said outer gimbal ring to rotate therewith about said outer ring axis, a second cam follower for said second cam, a brake for said second cam, brake controlling means operable by said motor means to start timing a holding period for said second cam and apply said brake thereto after said motor means is energized and to release said brake from said cam at the end of said period, a first caging means operable by said motor means after said motor means is energized simultaneously directly to press said first cam follower on said first cam to urge said first cam towards its caged position and resiliently to press said second cam follower on said second cam to urge said second cam towards its caged position against the restraint of said brake, said first caging means including means timed to move said first cam into its caged position before the end of said holding period for said brake, a first latch means for said first caging means for latching said first caging means in its position of urging both said cams towards their caged positions after said first cam is in its caged position, whereby after the end of said holding period and said first caging means is latched said second cam will be resiliently pressed to its caged position by said second cam follower and said motor means will move out of engagement with said first caging means and complete its caging cycle.

3. The apparatus of claim 2 in which said means for latching both said gimbal rings of said gyroscope in their caged positions includes on each of said cams at its respective caged position with respect to its cam follower a radial slot having circumferentially spaced parallel sides and associated with each of said cam followers a radial tongue having circumferentially spaced parallel sides positioned respectively to cooperate with the one of said slots on its respective cam to drop radially into said slot when said cam reaches its caged position.

4. The apparatus of claim 3 in which said means for simultaneously unlatching both said gimbal rings from their caged positions includes a spring system, said first caging means including means for storing uncaging energy in said spring system as said gimbal rings are caged and said first caging means is latched by said first latch means and means for unlatching said first latch means, said resilient spring system including spring means operating simultaneously on said tongues instantaneously to withdraw said tongues radially from said slots.

References Cited in the file of this patent
UNITED STATES PATENTS

| | | |
|---|---|---|
| 2,591,741 | Stone | Apr. 8, 1952 |
| 2,771,778 | Ryberg | Nov. 27, 1956 |
| 2,808,727 | Gabrielson | Oct. 8, 1957 |